(12) United States Patent
Tanabe

(10) Patent No.: US 8,280,234 B2
(45) Date of Patent: Oct. 2, 2012

(54) VIDEO SERVER, VIDEO EDITING SYSTEM, AND METHOD FOR RECORDING AND REPRODUCING VIDEO DATA OF THE VIDEO SERVER

(75) Inventor: Osamu Tanabe, Fuchu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1190 days.

(21) Appl. No.: 12/023,810

(22) Filed: Jan. 31, 2008

(65) Prior Publication Data

US 2008/0219640 A1 Sep. 11, 2008

(30) Foreign Application Priority Data

Mar. 9, 2007 (JP) ................................. 2007-060663

(51) Int. Cl.
*H04N 5/783* (2006.01)
(52) U.S. Cl. ........................ 386/343; 725/114
(58) Field of Classification Search .................. 386/343; 725/114
See application file for complete search history.

(56) References Cited

U.S. PATENT DOCUMENTS

| | | | | |
|---|---|---|---|---|
| 4,862,296 A * | 8/1989 | Murabayashi et al. | ....... | 386/204 |
| 5,841,941 A * | 11/1998 | Morimoto et al. | ............ | 386/324 |
| 5,960,150 A * | 9/1999 | Ueda et al. | ..................... | 386/314 |
| 5,982,431 A * | 11/1999 | Chung | ..................... | 375/240.01 |
| 6,047,100 A * | 4/2000 | McLaren | ...................... | 386/343 |
| 6,058,240 A * | 5/2000 | McLaren | ...................... | 386/326 |
| 6,122,433 A * | 9/2000 | McLaren | ...................... | 386/326 |
| 6,185,340 B1 * | 2/2001 | Comer | .......................... | 382/236 |
| 6,201,927 B1 * | 3/2001 | Comer | .......................... | 386/314 |
| 6,222,979 B1 * | 4/2001 | Willis et al. | .................... | 386/323 |
| 6,363,212 B1 * | 3/2002 | Fujinami et al. | ............... | 386/338 |
| 6,611,652 B1 * | 8/2003 | Iwamoto et al. | ............... | 386/231 |
| 6,977,964 B1 * | 12/2005 | Asamura et al. | ......... | 375/240.28 |
| 7,092,192 B1 * | 8/2006 | Yoshihiro | .................. | 360/73.06 |
| 7,174,090 B2 * | 2/2007 | Asamura et al. | ............... | 386/330 |
| 7,978,959 B2 * | 7/2011 | Megeid | ......................... | 386/327 |
| 2002/0035407 A1 * | 3/2002 | Ishito et al. | ..................... | 700/94 |
| 2002/0037152 A1 * | 3/2002 | Kato et al. | ....................... | 386/46 |
| 2003/0009722 A1 * | 1/2003 | Sugiyama et al. | ............ | 714/779 |
| 2004/0028376 A1 * | 2/2004 | Maita | ............................... | 386/68 |
| 2004/0047612 A1 * | 3/2004 | Nagata et al. | ................... | 386/98 |
| 2004/0062524 A1 * | 4/2004 | Megeid | .......................... | 386/68 |

(Continued)

FOREIGN PATENT DOCUMENTS

CN 1241780 A 1/2000

(Continued)

OTHER PUBLICATIONS

Notification of the First Office Action issued by the Chinese Patent Office in Chinese Patent Application No. 20081088124.4, mailed Aug. 21, 2009.

(Continued)

*Primary Examiner* — David García Cervetti
(74) *Attorney, Agent, or Firm* — Finnegan, Henderson, Farabow, Garrett & Dunner, L.L.P.

(57) ABSTRACT

In a video server, rate information showing a bit rate in encoding input video data from a recording line is stores on a recording medium together with encoded data, and a reproduction speed is controlled in accordance with the rate information so that the higher the bit rate is in preview-reproducing, the lower the reproduction speed becomes.

16 Claims, 2 Drawing Sheets

U.S. PATENT DOCUMENTS

| | | | |
|---|---|---|---|
| 2004/0081437 A1* | 4/2004 | Asada et al. | 386/131 |
| 2005/0117889 A1* | 6/2005 | Seita | 386/95 |
| 2006/0218603 A1* | 9/2006 | Kanehira | 725/89 |
| 2008/0138044 A1* | 6/2008 | Kawate et al. | 386/124 |
| 2010/0100390 A1* | 4/2010 | Tanaka | 704/503 |
| 2010/0284568 A1* | 11/2010 | Tojo | 382/103 |

FOREIGN PATENT DOCUMENTS

| | | |
|---|---|---|
| CN | 1835573 A | 9/2006 |
| JP | 5-225237 | 9/1993 |
| JP | 2000-285597 | 10/2000 |
| JP | 2002-320203 | 10/2002 |
| JP | 2004-180289 | 6/2004 |
| WO | WO 01/63920 | 8/2001 |

OTHER PUBLICATIONS

Notification of Reasons for Rejection issued by the Japanese Patent Office in Japanese Patent Application No. 2007-060663, mailed Dec. 9, 2008.

* cited by examiner

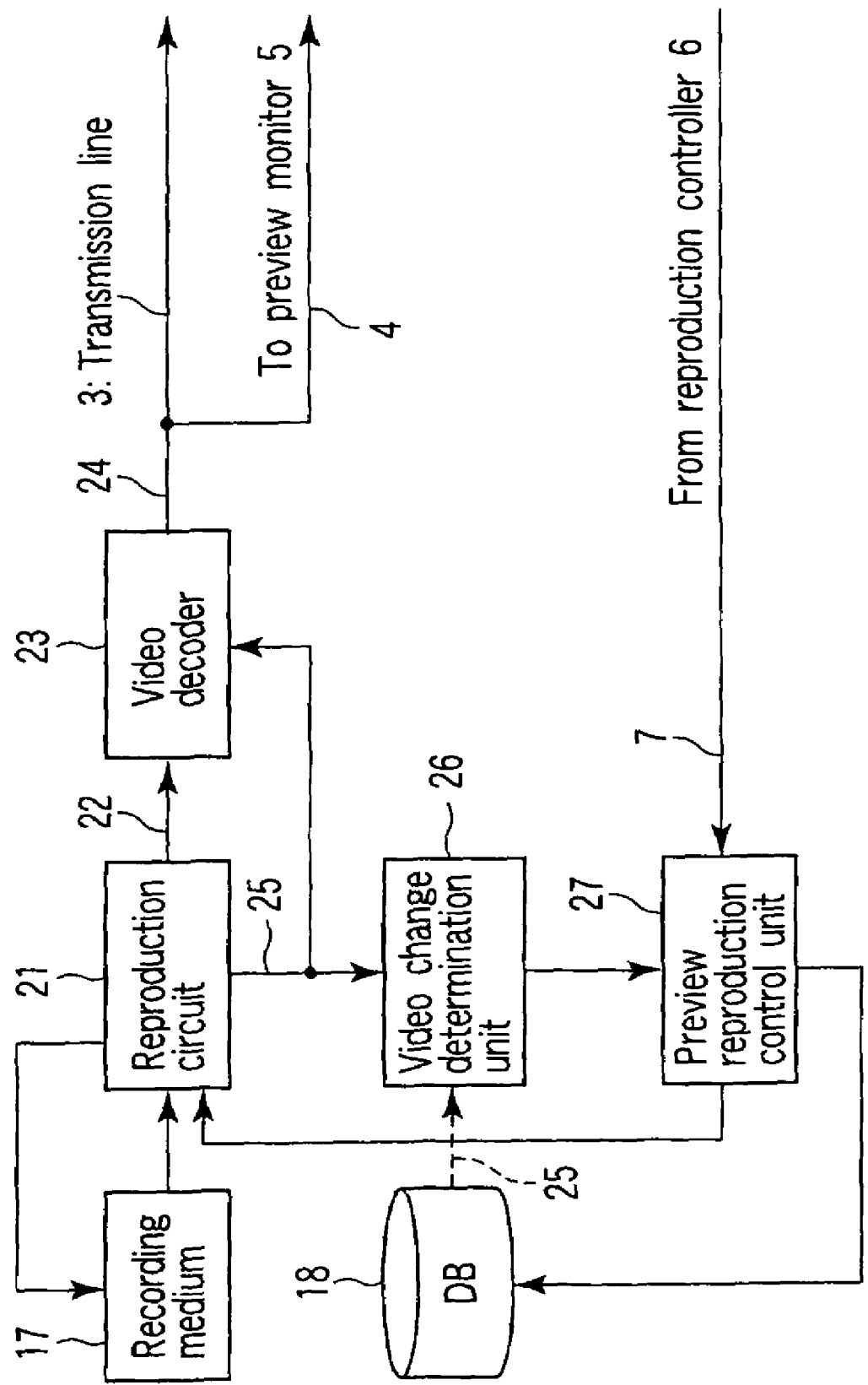
F I G. 3

VIDEO SERVER, VIDEO EDITING SYSTEM, AND METHOD FOR RECORDING AND REPRODUCING VIDEO DATA OF THE VIDEO SERVER

CROSS-REFERENCE TO RELATED APPLICATIONS

This application is based upon and claims the benefit of priority from prior Japanese Patent Application No. 2007-060663, filed Mar. 9, 2007, the entire contents of which are incorporated herein by reference.

BACKGROUND OF THE INVENTION

1. Field of the Invention

The present invention relates to a video server, a video editing system with a variable speed preview function, and a method for recording and reproducing video data of the video server.

2. Description of the Related Art

Generally, in a program transmission system of television broadcasting, a recording video such as a video transmitted via a line and a video by a monitor camera are stored in a video server once. The video stored in the video server is edited by an operator and then appropriately transmitted from the video server. The operator edits the video stored in the video server while reproducing the video on a preview monitor.

In previewing for editing, it is preferable for the program transmission system in terms of efficiency to reproduce a video at an equal speed or a low speed in a section of a large variation of the video and to reproduce the video at a high-speed such as a double speed reproduction in a section of a small variation of the video. Especially, recording video to be transmitted from relay broadcasting site via the line is a monotonous video having a small variation or rarely having a variation in many cases, it is preferable to reproduce at a high speed in the section of such a monotonous video. Therefore, conventionally, a method, for manually searching points at which the video the video has changed through a shuttle operation, performs high-speed reproduction in the section of the monotonous video on the basis of the search, and performs an equal-speed reproduction and a low-speed reproduction, is employed.

In contrast, a video system, in which records a video on a recording medium by imaging the video at a frame rate of a slightly higher speed or a slightly lower speed than a standard frame rate by means of an imaging unit of which the frame rate in imaging is variable and by reproducing the video at the standard frame rate in reproducing, obtains a vigorous slow motion video and a vigorous high speed motion video, has been well known.

Jpn. Pat. Appln. KOKAI Publication No. 2002-320203 discloses a technique for automatically adjusting a reproduction speed in accordance with rate information in the case in which such a video system records information directly of indirectly indicating the frame rate at the imaging unit together the video on the recording medium and reproduces the video at a frame different from the standard frame rate in reproducing.

Jpn. Pat, Appln. KOKAI Publication No. 2004-180289 discloses a technique which records information showing a frame rate in imaging together with a video signal in a system similar to the technique disclosed in Jpn. Pat. Appln. KOAKI Publication No. 2002-320203, distinguishes the frame rate in imaging at editing, and adjusts a frame rate in reproducing.

However, Jpn. Pat. Appln. KOKAI Publication No. 2002-320203 and Jpn. Pat. Appln. KOKAI Publication No. 2004-180289 do not describe the techniques for automatically adjusts the frame rates in reproducing in response to changes in video.

As mentioned above, in editing the video stored in the video server while reproducing the video on a preview monitor, it is preferable to reproduce the video at a relative slow speed in a section with a drastic change in video and to reproduce at a high speed in a section with a small change. In this case, generally, since a method of the video system for manually searching points at which changes in video have occurred by the shuttle operation and for manually adjusting a reproduction speed on the basis of the search result, there is a problem that work efficiency of editing by an operator is poor.

BRIEF SUMMARY OF THE INVENTION

An object of the present invention is to provide a video server, a video editing system, and a method for recording and reproducing video data of the video server configured to pre-view at a variable speed in response to a change in video without needing a manual operation.

According to first aspect of the invention, there is provided a video server comprising: a video encoder which encodes input video data at a variable bit rate to output the encoded data; a rate control unit which controls the bit rate and also outputs rate information showing the bit rate; a recording unit which records the encoded data and the rate information on a recording medium; a reproduction unit which reproduces the encoded data recorded on the recording medium at a variable reproduction speed to output the reproduced encoded data, and reproduces the rate information recorded on the recording medium to output the reproduced rate information; a video decoder which reproduces the reproduced encoded data to output reproduced video data; and a reproduction control unit which controls the reproduction speed in accordance with the reproduction rate information so that higher the bit rate is, the lower the reproduction speed becomes.

According to second aspect of the invention, there is provided a video server comprising: a video encoder which encodes input video data at a variable bit rate to output the encoded data; a rate control unit which controls the bit rate and also stores rate information showing the bit rate in a database; a recording unit which records the encoded data on a recording medium; a reproduction unit which reproduces the encoded data recorded on the recording medium at a variable reproduction speed to output the reproduced encoded data; a video decoder which reproduces the reproduced encoded data to output reproduced video data; and a reproduction control unit which controls the reproduction speed in accordance with the reproduction rate information so that the higher the bit rate is, the lower the reproduction speed becomes.

According to third aspect of the invention, there is provided a video editing system comprising: a server, according to one of the first or second aspect of the invention: a reproduction controller which makes the video server specify video data to be recorded on the recording unit to selectively execute reproduction of the video data: and a preview monitor which displays a video in accordance with the video data to be reproduced from the video server.

According to forth aspect of the invention, there is provided a method for recording and reproducing video data of the video server of the one embodiment of the invention comprising: encoding input video data at a variable bit rate;

recording the encoded data and rata information showing a bit rate in the encoding on a recording medium; reproducing the encoded data recorded on the recording medium at a variable reproduction speed to output the reproduced encoded data; reproducing the rate information recorded on the recording medium to output the reproduced rate information; decoding the reproduced encoded data to output the reproduced video data; and controlling the reproduction speed in accordance with the reproduction rate information so that the higher the bit rate is, the lower the reproduction speed becomes.

According to fifth aspect of the invention, there is provided a method for recording and reproducing video data of the video server of another embodiment of the invention comprising: encoding input video data at a variable bit rate; recording the encoded data on a recording medium; storing rate information showing a bit rate in the encoding in a database and reproducing the encoded data recorded on the recording medium at a variable reproduction speed to out put the reproduced encoded data; decoding the reproduced encoded data to output the reproduced video data; controlling the reproduction speed in accordance with the rate information stored in the database so that the higher the bit rate is, the lower the reproduction speed becomes.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 3 is a block diagram illustrating a configuration on a reproducing side of the video server regarding the embodiment.

DETAILED DESCRIPTION OF THE INVENTION

Hereinafter, one embodiment of the present invention will be described with reference to the drawings.

Figure 1:
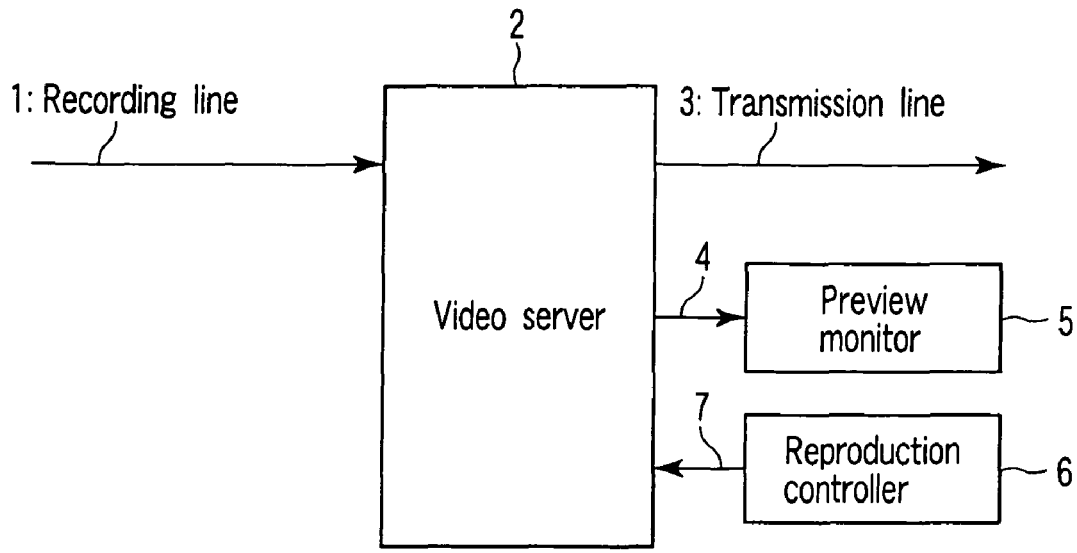
FIG. 1 is a block diagram illustrating a configuration of a video editing system including a video server regarding one embodiment of the invention.

Input video data 10 is input in a video editing system including a video server regarding the embodiment of the invention via a recording line 1, as shown in FIG. 1. The video data 10 is data of video to be transmitted, for example, from a relay broadcasting site or other server, etc., via a line or data of video acquired by a monitor camera. The video data 10 is stored in a video server 2. The video data stored in the video server 2 is appropriately transmitted to a transmission line 3. The video server 2 connects a preview monitor 5 via a preview line 4 and further connects a reproduction controller 6 via a control line 7.

The video server 2 basically has functions of compressing the input video data from the recording line 1 and reproducing the stored video data to transmit the reproduced video data to the transmission line 3. Further the video server 2 has a function of performing preview reproduction in response to a change in the video, thereby, the reproduced video data is displayed on the preview monitor 5 as a video.

The following will describe the video server 2.

Figure 2:
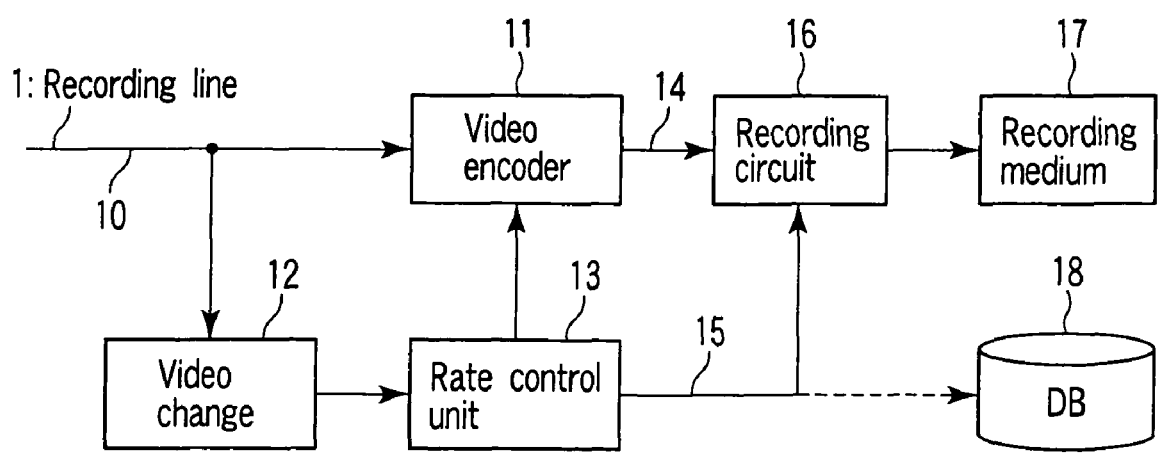
FIG. 2 is a block diagram illustrating a configuration on a recording side of the video server regarding the embodiment.

FIG. 2 depicts a configuration on the recording side of the video server 2. The video data 10 from the recording line 1 is input in a video encoder 11 and a video change determination unit 12. The encoder 11 encodes to compress the video data 10 in accordance with a motion picture encoding system such as MPEG-2 or H.264 and outputs encoded data 14.

The video change determination unit 12 determines a degree of temporal changes in the video depending on the video data 10, and outputs information showing a degree of change (hereinafter, referred to as degree of change determining information). A various types of methods of determining the degree of change of the video are possible approaches. For instance, using a parameter, reflecting a movement and a temporal change in and of the video, such as a movement vector (movement vector in usual block unit), global movement vector (movement vector of whole frame), or a difference among frames enables determining the degree of change.

Utilizing a still and movement determination technique determining a static area and a kinetic area within a screen of the video enables determining, for example, that the larger of the ratio of the kinetic area, the larger the degree of change of the video. Other than this, it is possible to determine the degree of change of the video by using a variety of well known techniques.

Degree of change determining information output from the video change determination unit 12 is input in a rate control unit 13. The control unit 13 has a function of basically controlling a bit rate of the video encoder 11 in encoding (bit rate of encoded data 14) in response to the amount of generated code of the encoder 11 and activity of a video of the video data 10. The control unit 13 in the embodiment has a function of controlling a bit rate also in accordance with degree of change determining information from the video change determination unit 12 in addition to that basic function.

In other words, in addition to the bit rate control on the basis of the amount of generated code of the video encoder 11 and the activity of the video, so that if the degree of change of the video is small the control unit 13 reduces the bit rate, if the degree of change of the video is large the control unit 13 increases the bit rate according to the degree of change determining information. The control unit 13 also outputs rate information showing the bit rate which has been set to the encoder 11 by the control unit 13.

The control itself of the bit rate by the rate control unit 13 is performed by controlling a quantization parameter (quantization width) to an orthogonal transformation coefficient, for example, in the case in which movement compensation prediction, discrete cosine transform (DCT) orthogonal transform, quantization and entropy encoding are used like a motion picture encoding system based on MPEG-2 or H.264. If the amount of generated code is large, the quantization width is made wider (the bit rate is reduced); conversely, if the amount of code is small, the quantization width is made narrow (the bit rate is increased).

The encoded data 14 to be output from the video encoder 11 is recorded on a recording medium 17 through a recording circuit 16. Meanwhile, the rate information 15 output from the rate control unit 13 is recorded in an ancillary area (an ancillary area other than an area in which the encoded data 14 is recorded) on the recording medium through the recording circuit 16. The recording medium 17 uses a large capacity storage device, for example, a flash memory preferably.

Like this, on the recording side of the video server 2, the recording medium 17 records the encoded data 14 to be obtained by encoding the input video data 10 by means of the video encoder 11, and also the recording medium 17 records the rate information 15 showing the bit rate at the video encoder 11 in the ancillary area on the recording area 17. On the reproduction side of the video encoder 2, a reproduction speed of the video data is controlled in accordance with the rate information reproduced from the recording medium 17.

FIG. 3 depicts a configuration on the reproduction side of the video encoder 11. The encoded data 14 recorded on the recording medium 17 is reproduced by the reproduction circuit 21, and the reproduced encoded data 22 is input in the video decoder 23. The video decoder 23 generates reproduced video data 24 by decoding the encoded data 22. The reproduced video data 24 is transmitted on the transmission line 3 and supplied to the preview monitor 5 via the preview line 4 in preview reproducing.

In the meantime, the reproduction circuit 21 also reproduces the rate information recorded in the ancillary area and outputs reproduction information 25 from the circuit 21. The reproduction rate information 25 is input in a video change determination unit 26. The video change determination unit 26 determines the degree of change of the video in the reproduced video data 24 and supplies the degree of change determining information to a preview reproduction control unit 27.

When receiving a preview command signal specifying video encoding data from the reproduction controller via the control line 7, the control unit 27 issues selection instructions of encoded data to the reproduction circuit 21 to read the corresponding-encoded data from the recording medium 17. According to the degree of change information supplied from the video change determination unit 26, the control unit 27 controls the reproduction speed at the reproduction circuit 21 in preview-reproduction. That is, if the degree of change of the video is small, the reproduction speed is made relatively high (e.g., high speed reproduction), and if the degree of change is large, the reproduction speed is made relatively low (equal speed reproduction or low speed reproduction).

As a result, when an operator performs video editing while monitoring the video on the preview monitor 5, regards a video with a small degree of change, for example, a monotonous video such as a recording video from a relay broadcasting site is reproduced at a high speed, only a video with a large degree of change is reproduced at relatively low speed and then the work efficiency in editing is improved. In other words, the operator may save the trouble to manually search points at which the videos are changed by means of the shuttle operation as usual, and to adjust the reproduction speed on the basis of the points, and may perform operations, which have been performed manually, in an automated manner.

The present invention may implement in a various modified forms as given below. For instance, while the foregoing descriptions have described the case in which the recording medium 17 records the rate information 15, a database 18 prepared in the video server system as shown in FIG. 2 may stores the rate information 17. In preview-reproducing, the reproduction control unit 27 instructs encoded data to be previewed by the database 18 from the control unit 17 as shown in FIG. 3 and reads the corresponding-rate information 25 from the database 18 to supply the rate information to the video change determination unit 26.

It should be noted that the bit rate in encoding at the video encoder 11 reflects to some extent the degree of change of the video even only by the rate control in accordance with the conventional amount of generated code and the activity. That is, if the degree of change of the video is large, since, for example, the differences among frames and the predicted residual differences in predicting movement compensation at the video encoder 11 become large, the rate control is conducted so as to reduce the bit rate in order to increase the amount of generated code and suppress the amount of generated code as a result.

Accordingly, even if the rate control unit 13 performs only the conventional rate control on the basis of the amount of generated code and the activity, since the bit rate and the rate information 15 change to some extent depending on the degree of change of the video, the video change determination unit 12 may be omitted. Meanwhile, also on the reproduction side, the video change determination unit 26 may be omitted. That is, the preview reproduction control unit 27 may control the reproduction speed in accordance with the reproduction rate information 25 so that the higher the bit rate of the encoded data is, the lower the reproduction speed becomes.

The reproduction side may adds functions for the reproduction controller 6 of specifying a specific object (e.g. a person and a material body) in previewing via the control line 7, and controlling a reproduction speed so as to be preview-reproduced at a low speed for the video including the specified object therein regardless of the degree of change and the bit rate of the video. More specifically, for example, the reproduction side utilizes an arbitrary shape object encoding technique defined by MPEG-4 to encode the video data in recording, determines whether or not the object specified from the encoded data is included in the video in reproducing, and if the corresponding-object is included in the video, the reproduction speed may be lowered and the equal speed reproduction or the low speed reproduction may be performed.

Other than this, the invention is not limited to the specific details and representative embodiments shown and described herein, and in an implementation phase, this invention may be embodied in various forms without departing from the spirit or scope of the general inventive concept thereof. Various type of the invention can be formed by appropriately combining a plurality of constituents. Some of the elements, for example, may be omitted from the whole of the constituent elements, may be omitted from the whole of the constituent elements shown in the embodiments mentioned above. Further, the constituent elements over different embodiments may be appropriately combined.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A video server, comprising:
   a video encoder which encodes input video data at a variable bit rate to output the encoded data;
   a rate control unit which controls the bit rate and also outputs rate information showing the bit rate;
   a recording unit which records the encoded data and the rate information on a recording medium;
   a reproduction unit which reproduces the encoded data recorded on the recording medium at a variable reproduction speed to output the reproduced encoded data, and reproduces the rate information recorded on the recording medium to output the reproduced rate information;

a video decoder which reproduces the reproduced encoded data to output reproduced video data; and a reproduction control unit which controls the reproduction speed in accordance with the reproduction rate information so that higher the bit rate is, the lower the reproduction speed becomes, wherein the reproduction control unit controls the reproduction speed so as to lower the reproduction speed regardless of the bit rate when a prescribed object exists in a video.

2. The video server according to claim 1, further comprising:

a determining unit which determines a degree of change of a video from the input video data, wherein the rate control unit controls the bit rate so that the larger a degree of change of a video is, the higher the bit rate becomes.

3. The video server according to claim 1, wherein the reproduction control unit controls the reproduction speed in accordance with the reproduction rate information so that the larger a degree of change of a video is, the lower the reproduction speed becomes.

4. The video server according to claim 1, wherein the reproduction control unit controls the reproduction speed so as to lower the reproduction speed regardless of the bit rate when a movement partially occurs.

5. A video editing system, comprising:

a video server according to claim 1, a reproduction controller which makes the video server specify video data to be recorded in the recording unit to selectively execute reproduction of the video data; and a preview monitor which displays a video in accordance with the video data to be reproduced from the video server.

6. The video editing system according to claim 5, further comprising:

a determining unit which determines a degree of change of a video from the input video data, wherein the rate control unit controls the bit rate so that the larger a degree of change of a video is, the higher the bit rate becomes.

7. The video editing system according to claim 5, wherein the reproduction control unit controls the reproduction speed in accordance with the reproduction rate information so that the larger a degree of change of a video is, the lower the reproduction speed becomes.

8. The video editing system according to claim 5, wherein the reproduction control unit controls the reproduction speed so as to lower the reproduction speed regardless of the bit rate when a movement partially occurs.

9. A video server, comprising:

a video encoder which encodes input video data at a variable bit rate to output the encoded data;

a rate control unit which controls the bit rate and also stores rate information showing the bit rate in a database;

a recording unit which records the encoded data on a recording medium;

a reproduction unit which reproduces the encoded data recorded on the recording medium at a variable reproduction speed to output the reproduced encoded data;

a video decoder which reproduces the reproduced encoded data to output reproduced video data; and a reproduction control unit which controls the reproduction speed in accordance with the reproduction rate information so that the higher the bit rate is, the lower the reproduction speed becomes, wherein the reproduction control unit controls the reproduction speed so as to lower the reproduction speed regardless of the bit rate when a prescribed object exists in a video.

10. The video server according to claim 9, further comprising:

a determining unit which determines a degree of change of a video from the input video data, wherein the rate control unit controls the bit rate so that the larger a degree of change of a video is, the higher the bit rate becomes.

11. The video server according to claim 9, wherein the reproduction control unit controls the reproduction speed in accordance with the rate information stored in the database so that the larger a degree of change of a video is, the lower the reproduction speed becomes.

12. A video editing system, comprising:

a video server according to claim 9, a reproduction controller which makes the video server specify video data to be recorded in the recording unit to selectively execute reproduction of the video data; and a preview monitor which displays a video in accordance with the video data to be reproduced from the video server.

13. The video editing system according to claim 12, further comprising:

a determining unit which determines a degree of change of a video from the input video data, wherein the rate control unit controls the bit rate so that the larger a degree of change of a video is, the higher the bit rate becomes.

14. The video editing system according to claim 12, wherein the reproduction control unit controls the reproduction speed in accordance with the rate information stored in the database so that the larger a degree of change of a video is, the lower the reproduction speed becomes.

15. A method for recording and reproducing video data of a video server, comprising:

encoding input video data at a variable bit rate;

recording the encoded data and rata information showing a bit rate in the encoding on a recording medium;

reproducing the encoded data recorded on the recording medium at a variable reproduction speed to output the reproduced encoded data;

reproducing the rate information recorded on the recording medium to output the reproduced rate information;

decoding the reproduced encoded data to output the reproduced video data; and controlling the reproduction speed in accordance with the reproduction rate information so that the higher the bit rate is, the lower the reproduction speed becomes, wherein the reproduction speed is controlled so as to lower the reproduction speed regardless of the bit rate when a prescribed object exists in a video.

16. A method for recording and reproducing video data of a video server, comprising:

encoding input video data at a variable bit rate;

recording the encoded data on a recording medium;

storing rate information showing a bit rate in the encoding in a database and reproducing the encoded data recorded on the recording medium at a variable reproduction speed to out put the reproduced encoded data;

decoding the reproduced encoded data to output the reproduced video data;

controlling the reproduction speed in accordance with the rate information stored in the database so that the higher the bit rate is, the lower the reproduction speed becomes, wherein the reproduction speed is controlled so as to lower the reproduction speed regardless of the bit rate when a prescribed object exists in a video.

* * * * *